(12) United States Patent
Kim et al.

(10) Patent No.: US 8,869,757 B2
(45) Date of Patent: Oct. 28, 2014

(54) APPARATUS OF COOLING SYSTEM FOR VEHICLE AND CONTROLLING METHOD USING THE SAME

(75) Inventors: Woo Seok Kim, Bucheon-si (KR); Jonghwa Lee, Yongin-si (KR); Jinil Park, Seongnam-si (KR); Kyoungseok Park, Gumi-si (KR); Hyoseong Wi, Suwon-si (KR)

(73) Assignees: Hyundai Motor Company, Seoul (KR); Kia Motors Corporation, Seoul (KR); Ajou University Industry Cooperation Foundation, Suwon-Si (KR)

(*) Notice: Subject to any disclaimer, the term of this patent is extended or adjusted under 35 U.S.C. 154(b) by 420 days.

(21) Appl. No.: 13/301,302

(22) Filed: Nov. 21, 2011

(65) Prior Publication Data

US 2012/0137993 A1 Jun. 7, 2012

(30) Foreign Application Priority Data

Dec. 7, 2010 (KR) .......................... 10-2010-0124359

(51) Int. Cl.
| | |
|---|---|
| *F01P 1/06* | (2006.01) |
| *F01P 3/00* | (2006.01) |
| *F01P 7/16* | (2006.01) |
| *F02B 29/04* | (2006.01) |
| *F02M 25/07* | (2006.01) |

(52) U.S. Cl.
CPC ............ *F01P 7/165* (2013.01); *F02M 25/0732* (2013.01); *Y02T 10/146* (2013.01); *F01P 2060/04* (2013.01); *F02B 29/0443* (2013.01); *F01P 2060/02* (2013.01); *F02M 25/0731* (2013.01); *F01P 2060/08* (2013.01)

USPC ................ 123/41.31; 123/41.12; 123/41.29; 123/563; 123/568.12; 60/320; 60/599

(58) Field of Classification Search
USPC .......... 123/41.12, 41.29, 41.31, 41.33, 41.44, 123/563, 568.12; 60/320, 599, 605.2
See application file for complete search history.

(56) References Cited

U.S. PATENT DOCUMENTS

| | | | | |
|---|---|---|---|---|
| 5,215,044 | A * | 6/1993 | Banzhaf et al. ............ | 123/41.29 |
| 7,650,753 | B2 * | 1/2010 | Muller et al. .............. | 123/41.31 |

FOREIGN PATENT DOCUMENTS

| | | |
|---|---|---|
| JP | 2002-59749 A | 2/2002 |
| JP | 2010-65543 A | 3/2010 |

* cited by examiner

*Primary Examiner* — Noah Kamen
(74) *Attorney, Agent, or Firm* — Morgan, Lewis & Bockius LLP (57) ABSTRACT

A cooling system of a vehicle may include a high and low temperature radiators that cool a high and low temperature coolants respectively circulating an engine and passing a water cooled intercooler and a low exhaust gas recirculation cooler of a turbo charger, a cooling fan that blows air to the high temperature radiator and the low temperature radiator, a high temperature coolant pump that pumps the high temperature coolant, a low temperature coolant pump that pumps the low temperature coolant, and a control portion that controls the high temperature coolant pump, the low temperature coolant pump, and the cooling fan according to driving conditions of the vehicle and environmental conditions. A controlling method may include detecting driving conditions of the vehicle and environmental conditions, setting an operating target for the cooling system and/or a lubrication system, and determining operating conditions for the cooling system and/or the lubrication system.

13 Claims, 7 Drawing Sheets

APPARATUS OF COOLING SYSTEM FOR VEHICLE AND CONTROLLING METHOD USING THE SAME

CROSS-REFERENCE TO RELATED APPLICATION

The present application claims priority of Korean Patent Application Number 10-2010-0124359 filed in the Korean Intellectual Property Office on Dec. 7, 2010, the entire contents of which application is incorporated herein for all purposes by this reference.

BACKGROUND OF INVENTION

1. Field of Invention

The present invention relates to a cooling system of a vehicle, and more particularly relates to a vehicle cooling system that considers environmental elements and driving elements to control a cooling system and a lubrication system so as to effectively use heat energy that is wasted in a conventional art and the control method using the same.

2. Description of Related Art

Generally, an engine and a transmission of a vehicle is operated in a high temperature, or a range of high temperatures, that is formed by combustion of fuel and friction of each components. Coolant passages are formed to cool the hot engine and transmission, and a thermostat 40 is provided to change the coolant passage so as to quickly warm up the cold engine. A radiator is disposed to cool the heat of the coolant. And, a cooling fan is disposed to increase heat exchanging amount of the radiator.

Generally, an engine consumes smaller amount of fuel in a warm condition compared to that in a cold condition, and therefore a fast warming up improves fuel efficiency. Also, if the engine is operated in a high temperature regardless of the durability of the engine, the fuel consumption efficiency can be increased.

Engine oil and transmission oil are used to lubricate the engine and the transmission, the lubrication oil contacting sliding portions of the engine and the transmission has a low friction characteristic in a high temperature and has a high friction characteristic in a low temperature, and the low friction characteristic improves the fuel consumption efficiency. However, when the oil is over heated to above a predetermined value, the sliding components can be damaged by a mechanical contact, and a heat exchanger is disposed to prevent the over heat of the oil. Meanwhile, the heat exchanger can excessively lower a temperature of the lubrication oil in cases when an outside temperature is low, it's raining, a load of an engine is low, or a vehicle speed is low such that viscosity of the lubrication oil is increased and there is a side effect that a power is lost by the increased viscosity.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a cooling system of a vehicle having advantages of minimizing a fuel consumption of a vehicle by considering heat generation amount and cooling amount according to a vehicle speed, an outside temperature, a rainfall, an engine operating area, and so on.

Exemplary cooling systems may include a high temperature radiator that cools a high temperature coolant circulating an engine, a low temperature radiator that cools a low temperature coolant passing a water cooled intercooler and a low exhaust gas recirculation (EGR) cooler of a turbo charger, a cooling fan that blows air to the high temperature radiator and the low temperature radiator, a high temperature coolant pump that pumps the high temperature coolant, a low temperature coolant pump that pumps the low temperature coolant, and a control portion that controls the high temperature coolant pump, the low temperature coolant pump, and the cooling fan according to driving conditions of the vehicle and environmental conditions.

Exemplary cooling systems may further include a transmission oil heat exchanger through which the high temperature coolant passes, a transmission pump that circulates a transmission oil through the transmission oil heat exchanger, an axle oil heat exchanger through which the high temperature coolant passes, and an axle pump that circulates an axle oil through the axle oil heat exchanger. The transmission pump and the axle pump may be hydraulic pumps.

The control portion may operate the transmission pump to warm up the transmission oil if it is determined that a temperature of the transmission oil is low, and/or operate the axle pump to warm up the axle oil if it is determined that a temperature of the axle oil is low.

The control portion may increase a flow rate of the low temperature coolant if a temperature of the low temperature coolant is equal to or higher than a first predetermined value, open an electric thermostat when a temperature of the high temperature coolant is equal to or higher than a predetermined thermostat opening temperature, and close the electric thermostat when the temperature of the high temperature coolant is less than a predetermined thermostat closing temperature. The thermostat closing temperature may be a few degrees lower than the thermostat opening temperature.

The control portion may detect a temperature of an engine oil, make the engine oil pass an oil cooler when the engine oil temperature is equal to or higher than a second predetermined value, and make the engine oil bypass the oil cooler when the engine oil temperature is less than the second predetermined value.

The control portion may operate the cooling fan at a first speed if a temperature of the high temperature coolant is equal to or higher than a third predetermined value, and operate the cooling fan at a second speed faster than the first speed if the high temperature coolant is not cooled by the first speed.

The control portion may operate the low temperature coolant pump based on a base map of the low temperature coolant pump and compensates the base map of the low temperature coolant pump according to the speed of the cooling fan to control the low temperature coolant pump. Similarly, the control portion may operate the high temperature coolant pump based on a base map of the high temperature coolant pump, and compensates the base map of the high temperature coolant pump according to the speed of the cooling fan to control the high temperature coolant pump.

The control portion may control the speed of the cooling fan according to the outside temperature or the rainfall conditions.

The controlling method using exemplary cooling systems according to the present invention may include detecting driving conditions of the vehicle and environmental conditions, setting an operating target for the cooling system and/or a lubrication system based on the driving conditions and the environmental conditions, and determining operating conditions for the cooling system and/or the lubrication system.

The driving conditions being detected may include a low coolant temperature, a high coolant temperature, an engine oil temperature, a transmission oil temperature, an engine speed, an accelerator pedal position, and/or a vehicle speed. The environmental conditions being detected may include an intake air temperature, an outside temperature, and/or weather conditions. The operating conditions being determined may include a cooling fan speed, opening/closing of an electric thermostat, controls of the pumps, and/or coolant flow rates.

In the present invention as described above, the engine, the transmission, the differential gear oil temperature, and so on are optimally controlled to reduce a friction of the driving train and a fuel consumption rate, the heat that is wasted by the cooling fan, the water pump, and the auxiliary portions are efficiently managed and a power for cooling system is reduced such that a fuel consumption rate of the vehicle is decreased.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
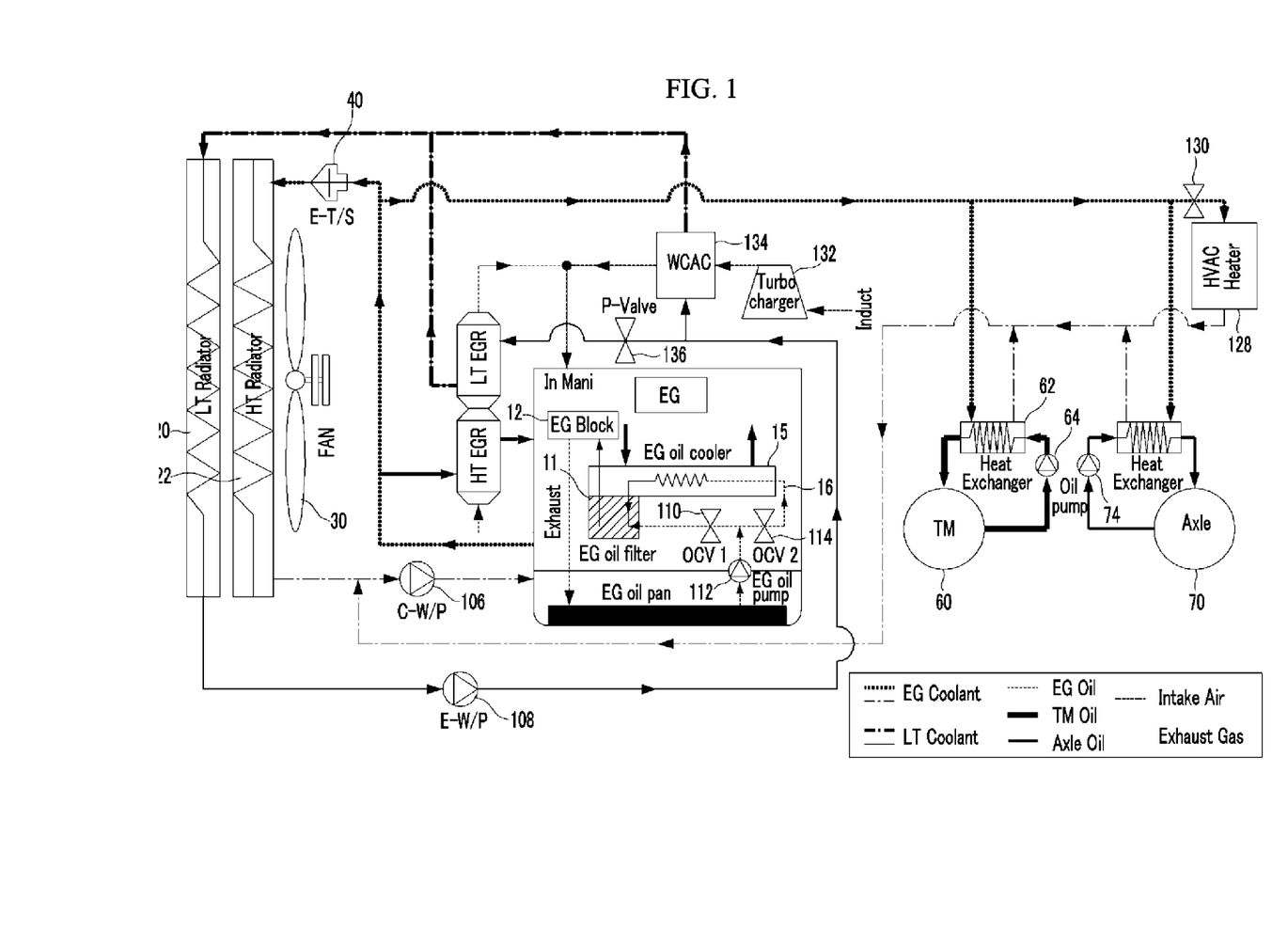
FIG. 1 is a schematic diagram of an exemplary vehicle cooling system according to the present invention.

Referring to FIG. 1, a cooling system of a vehicle includes a low temperature radiator 20, a high temperature radiator 22, a cooling fan 30, a high temperature coolant pump 106, a low temperature coolant pump 108, an oil filter 11, a first oil control valve 110, an engine hydraulic pump 112, a second oil control valve 114, a transmission 60, a transmission hydraulic pump 64, a transmission oil heat exchanger 62, an axle hydraulic pump 74, an axle 70, an axle oil heat exchanger 72, a HAVC heater 128, a HAVC valve 130, an engine oil cooler 15, a turbocharger 132, a water cooled intercooler 134, a low temperature coolant valve 136, a cylinder block 12, a low temperature exhaust gas recirculation (EGR) cooler 138, a high temperature EGR cooler 140, and electric thermostat 40.

A low temperature coolant circulates the low temperature radiator 20, the low temperature coolant pump 108, the water cooled intercooler 134, and the low temperature EGR cooler 138.

A high temperature coolant circulates the high temperature radiator 22, the high temperature coolant pump 106, the cylinder block 12, the high temperature EGR cooler 140, the HAVC heater 128, the transmission oil heat exchanger 62, and the axle oil heat exchanger 72.

The engine oil circulates the engine hydraulic pump 112, the engine oil cooler 15, and the cylinder block 12 and bypasses the engine oil cooler 15 through the bypass line 16 depending on a temperature of the engine oil. In this case, the first and second oil control valve 110 and 114 bypasses the engine engine oil.

Various embodiments of the present invention provide a vehicle cooling system to efficiently use the heat that is wasted from the cooling system of the vehicle. The electric thermostat 40 of the cooling system is an electrical device to change the opening rate of the thermostat 40 so as to control the coolant flow rate precisely such that the coolant temperature is maintained at a high level.

Figure 3:
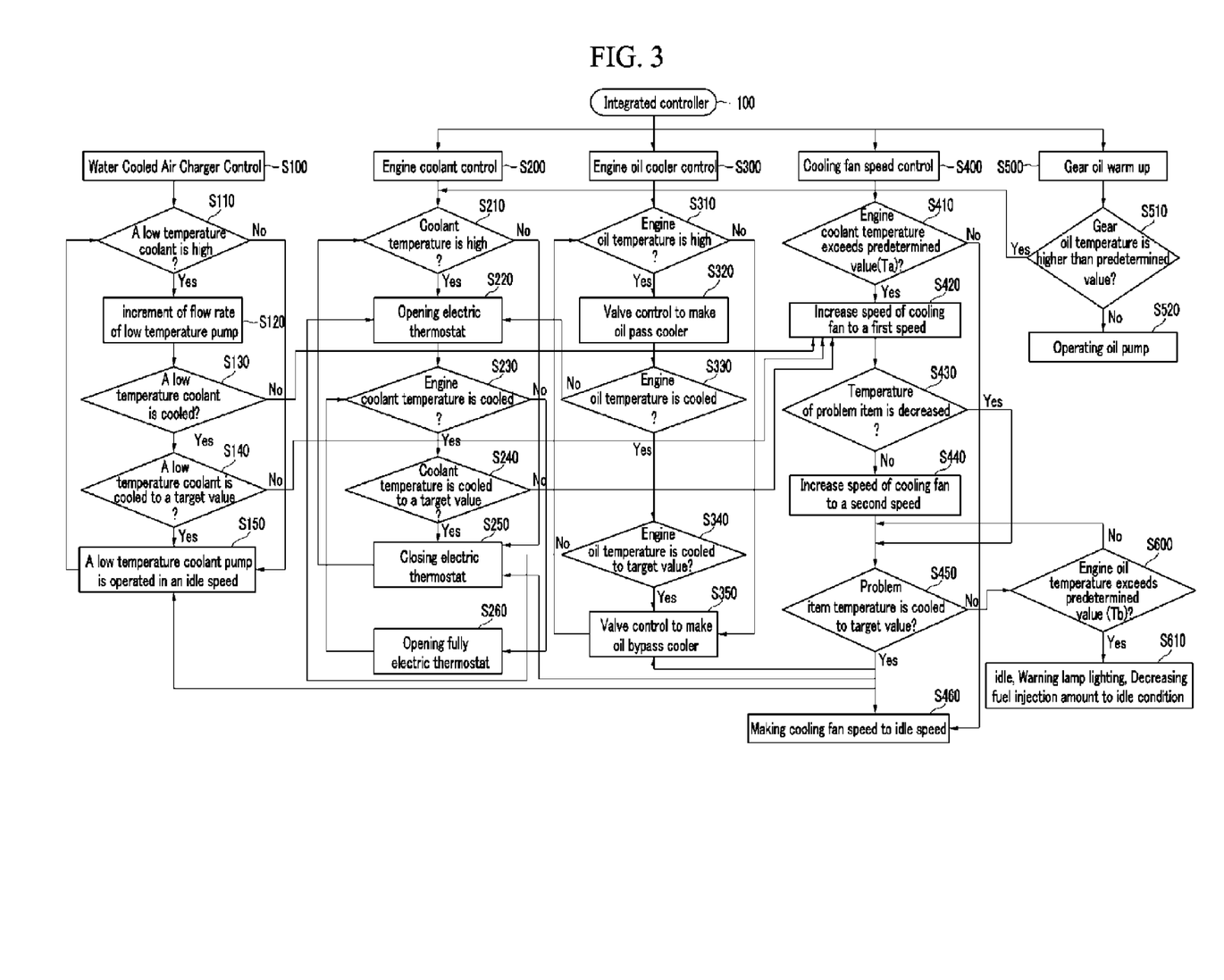
FIG. 3 is a flow chart of an exemplary vehicle cooling system integration control according to the present invention.
Figure 4:
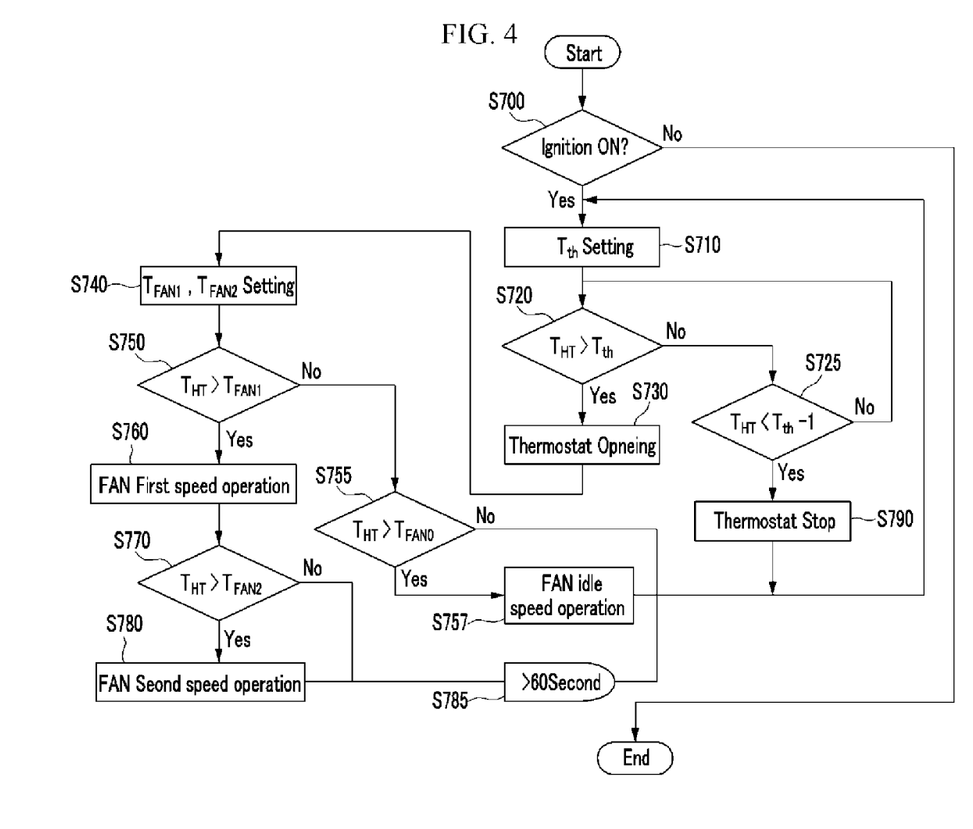
FIG. 4 is a flow chart of an exemplary engine coolant temperature control according to the present invention.

The cooling fan 30 is equipped with a clutch, such as a magnetic clutch, to control operating speed thereof and finds an efficient operating speed range according to a high temperature or a low temperature of the coolant. As shown in FIG. 4 and FIG. 3, the cooling fan 30 is connected to the high temperature coolant pump 106 and the electric thermostat 40 to adjust the operating speed in a few steps depending on the coolant temperature such that the consumption power of the engine is reduced.

A bypass line 16 is disposed around the engine oil cooler 15, a solenoid valve 114 is disposed on the bypass line 16, and the solenoid valves 110 and 114 are controlled by a controller to be operated according to the engine oil temperature such that the engine oil temperature is maintained uniformly.

In addition, the engine oil is controlled to be at a high temperature or a range of high temperatures; the temperature is accurately controlled while the engine operating state is being changed and the engine is quickly warmed up.

The transmission oil heat exchanger 62 and the axle oil heat exchanger 72 are disposed on the coolant line, and a transmission hydraulic pump and an axle hydraulic pump 64 and 74 circulates the oil so as to quickly warm up the transmission oil and the axle oil.

Figure 2:
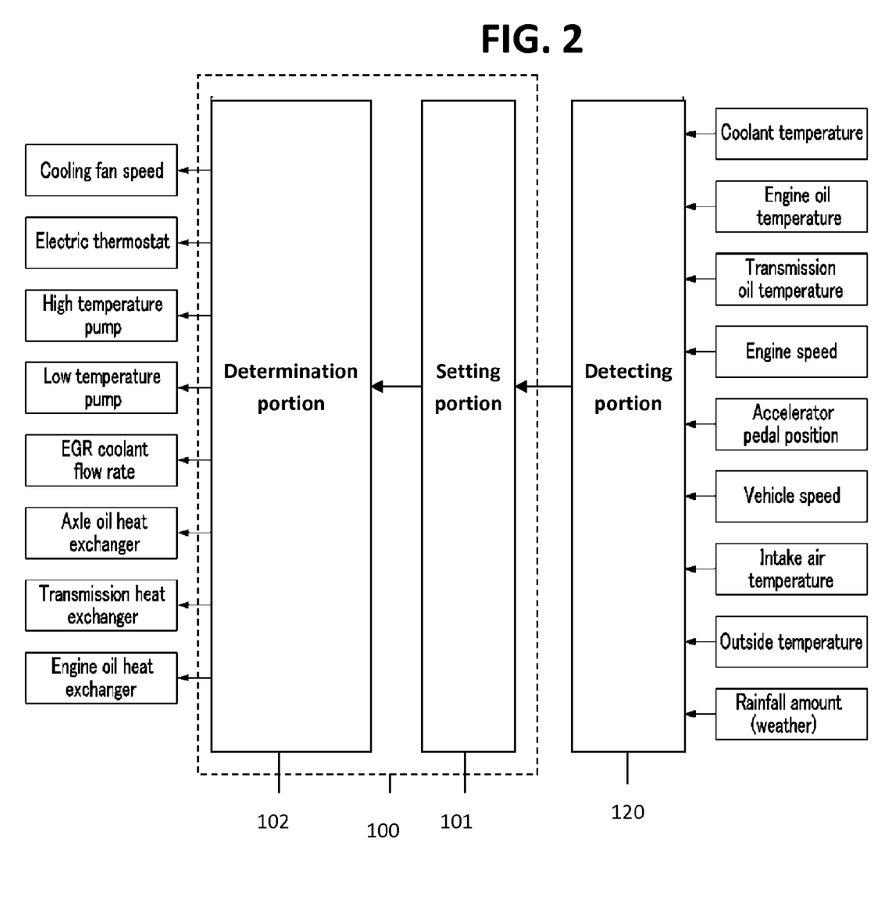
FIG. 2 is a block diagram of an exemplary cooling system integration control according to the present invention.

As shown in FIG. 2, an exemplary integrated controller according to the present invention includes a detecting step that detects a driving condition or conditions and an environmental element or elements of a vehicle through a detecting portion 120, a setting step that sets an operating target of a cooling system and lubrication system according to the driving condition and the environmental condition through a setting portion 101, and a determination step that determines an operating condition of the cooling system through the determination portion 102. A detecting portion 120 detects the driving condition and the environmental condition of the vehicle.

The detecting portion 120 can be sensors sensing all kinds of conditions, especially the detecting portion 120 detects a coolant temperature, an engine oil temperature, a transmission oil temperature, an engine speed, an acceleration pedal position, a vehicle speed, an outside temperature, rainfall, etc., and the position of the accelerator pedal is used to determine a power load that is applied to the engine.

That is, the integrated controller 100 receives the signal or signals from the detecting portion 120 to control the cooling system and the lubrication system according to the driving condition and the environmental condition of the vehicle. The integrated controller 100 sets a coolant temperature, an engine oil temperature, and a transmission oil temperature according to the driving condition and the environmental condition of the vehicle, performs a setting step that determines a control amount for each control element thereby, and determines whether the control elements is to be controlled.

The control temperature and the control amount of each element are varied according to a vehicle speed, an engine load, an outside temperature, and a rainfall condition in the setting step. For example, if the vehicle moves in a high speed, the cooling air passing the radiator is increased such that the operating speed of the cooling fan 30 can be decreased. Like the preceding, while the outside temperature is low in winter or it is raining, the cooling becomes easy, and it is not a big problem to maintain the control temperature at a high value.

However, in a case that the vehicle goes up an uphill road or the outside temperature is high in summer, the engine can be over heated, and therefore the control temperature of each element is to be lowered such that the stability of the system is securely maintained.

The engine coolant temperature is varied by a control speed of the high temperature coolant water pump 106 according to the driving condition and the environmental condition, and the thermostat 40 is operated in a case that the coolant temperature is higher than an operating temperature for operating the thermostat 40 to increase the cooling capacity of the radiator.

In addition, if the coolant temperature is raised by an increased heat amount of the engine and the cooling is necessary, the cooling fan 30 is operated to lower the coolant temperature.

Also, the transmission oil temperature is warmed up or cooled within a predetermined temperature range based on a temperature of the engine coolant and a temperature of the coolant passing the heat exchanger 62 such that a mechanical friction is reduced and a fuel consumption rate is improved. Like the preceding, if the engine oil is controlled within a predetermined temperature range, the mechanical friction is reduced and the fuel consumption rate is improved.

As described above, the integrated controller 100 according to various embodiments of the present invention efficiently controls the lubrication system and the cooling system to minimize a consumption power of the cooling fan 30, the hot temperature coolant water pump 106, and the low temperature coolant water pump 108 and prevents over cooling and over-heating of the engine and the transmission to maintain an optimized temperature thereof such that a power loss is reduced by a friction of each elements.

Referring to FIG. 3, the integrated controller 100 controls a temperature of a low temperature coolant passing the water cooled intercooler 134 through S100, S110, S120, S130, S140 and S150.

If the temperature of the low temperature coolant passing the water cooled intercooler 134 is high, a flowing rate of the coolant passing the low temperature coolant pump 108 is increased to lower the temperature of the low temperature coolant, If the temperature of the low temperature coolant is not lowered, the speed of the cooling fan 30 is increased in a S420.

Further, if the temperature of the low temperature coolant is lowered to be a target value, the low temperature coolant pump 108 is operated in an idle speed.

The temperature of the high temperature coolant is controlled through S200, S210, S220, S230, S240, S250, and S260. If the temperature of the high temperature coolant is high, the electric thermostat 40 is partially or completely opened. Further, if the temperature of the high temperature coolant is not lowered, the speed of the cooling fan 30 is raised in a S420.

The temperature of the engine oil is controlled through S300, S310, S320, S330, S340, and S350. If the temperature of the engine oil is high, the first and the second oil control valves 110 and 114 are controlled such that the engine oil passes the engine oil cooler 15, and if the engine oil temperature is lowered to a target value, the engine oil is controlled to bypass the engine oil cooler 15. Here, if the engine oil temperature is not lowered to the target value, S220 or S210 is performed to control the coolant temperature.

The integrated controller 100 controls a speed of the cooling fan through S400, S410, S420, S430, S440, S450, and S460.

If the high temperature coolant exceeds a predetermined value (Ta), an operating speed of the cooling fan 30 is raised to a first speed, and if a temperature of a dangerous item is not lowered, the operating speed of the cooling fan 30 is raised to a second speed that is faster than the first speed. Further, if the high temperature coolant is lowered to a target value, the speed of the cooling fan 30 is slowed to an idle condition, wherein the idle speed (slow)<the first speed (faster)<the second speed (fastest).

If the operating speed of the cooling fan 30 is on the second speed and the temperature of the high temperature coolant is not lowered, S600 is performed, wherein if the engine oil temperature exceeds a predetermined value (Tb), a warning lamp is lighted and the engine speed is suppressed to an idle speed.

The controller warms up a transmission oil and a axle oil to a predetermined value through S500, S510, and S520. If the temperature of the transmission oil and the axle oil is less than a predetermined value, the controller operates the transmission hydraulic pump 64 and the axle hydraulic pump 74 such that the high temperature coolant heats the oil (transmission oil and axle oil). Here, if the transmission oil and the axle oil is higher than a predetermined value, S210 is performed.

Furthermore, the controller operates the low temperature coolant pump based on a base map of the low temperature coolant pump and compensates the base map of the low temperature coolant pump according to the speed of the cooling fan to control the low temperature coolant pump. Similarly, the controller also operates the high temperature coolant pump based on a base map of the high temperature coolant pump, and compensates the base map of the high temperature coolant pump according to the speed of the cooling fan to control the high temperature coolant pump.

Referring to FIG. 4, the engine is operated in a S700, wherein Tth denotes a thermostat opening temperature. The thermostat opening temperature (Tth) is set by driving conditions and environmental conditions that are depicted in the FIG. 2, such as rainfall, atmosphere temperature, intake air temperature etc,.

In a S720, $T_{HT}$ denotes a coolant temperature. It is determined whether the coolant temperature is higher than the thermostat opening temperature(Tth), and if the coolant temperature is equal to or higher than the thermostat opening temperature (Tth), the electric thermostat 40 starts to be gradually opened in a S730. On the other hand, if the coolant temperature is less than the thermostat opening temperature (Tth), S725 is performed.

If the coolant temperature is less than the "thermostat opening temperature(Tth)–b" where b is a predetermined temperature interval, for example, b=1° C. in a S725, the electric thermostat 40 starts to be closed in a S790. Here, "thermostat opening temperature(Tth)–b" is referred as the thermostat closing temperature.

A first coolant temperature for the cooling fan operating in a first speed, which is faster than an idle speed, is set and a second coolant temperature for the cooling fan operating in a second speed, which is faster than the first speed, is set in a S740.

If the coolant temperature is equal to or higher than the first coolant temperature in a S750, the cooling fan 30 is operated in a first speed in a S760, and if the coolant temperature is equal to or higher than the second coolant temperature in a S770, the cooling fan 30 is operated in a second speed in a S780.

If the coolant temperature is equal to or higher than the idle temperature in S755, the cooling fan 30 is operated in an idle speed in S757, and if the coolant temperature is less than the idle temperature, the cooling fan 30 is stopped in a S757. The cooling fan 30 is operated for a predetermined period, for example approximately 60 seconds by S780 and S785.

Figure 5:
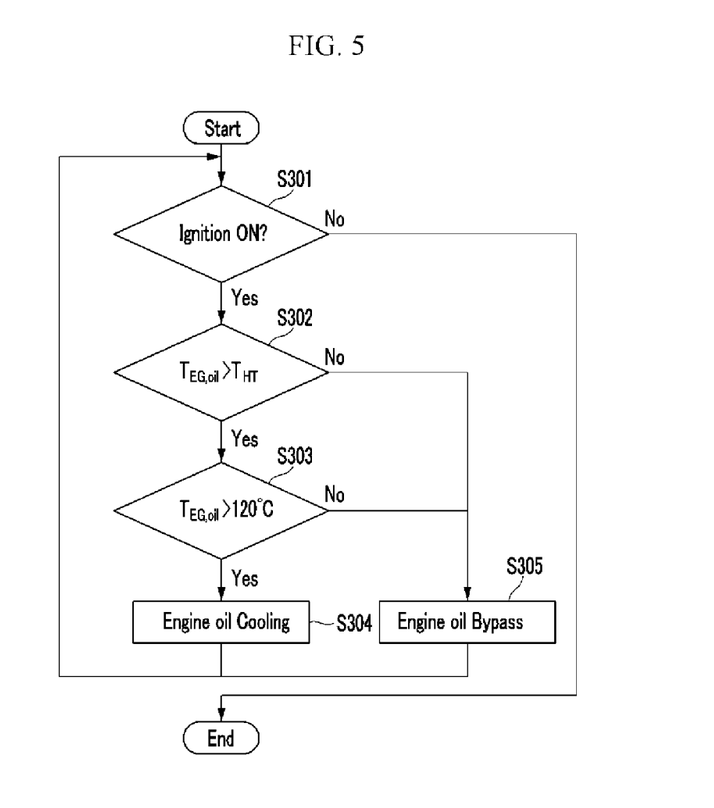
FIG. 5 is a flow chart of a bypass valve control of an exemplary engine oil cooler according to the present invention.

Referring to FIG. 5, an engine is operated in a S301 and it is determined whether the engine oil temperature is higher than a coolant temperature in a S302.

If the engine oil temperature is less than a coolant temperature, S305 is performed, and if the engine oil temperature is equal to or higher than the coolant temperature, it is determined whether the engine oil temperature exceeds a predetermined value, for example, 120° C. in S303.

If the engine oil temperature exceeds the predetermined value (for example, 120° C.), S304 is performed, and if the engine oil temperature does not exceeds it, S305 is performed.

Figure 6:
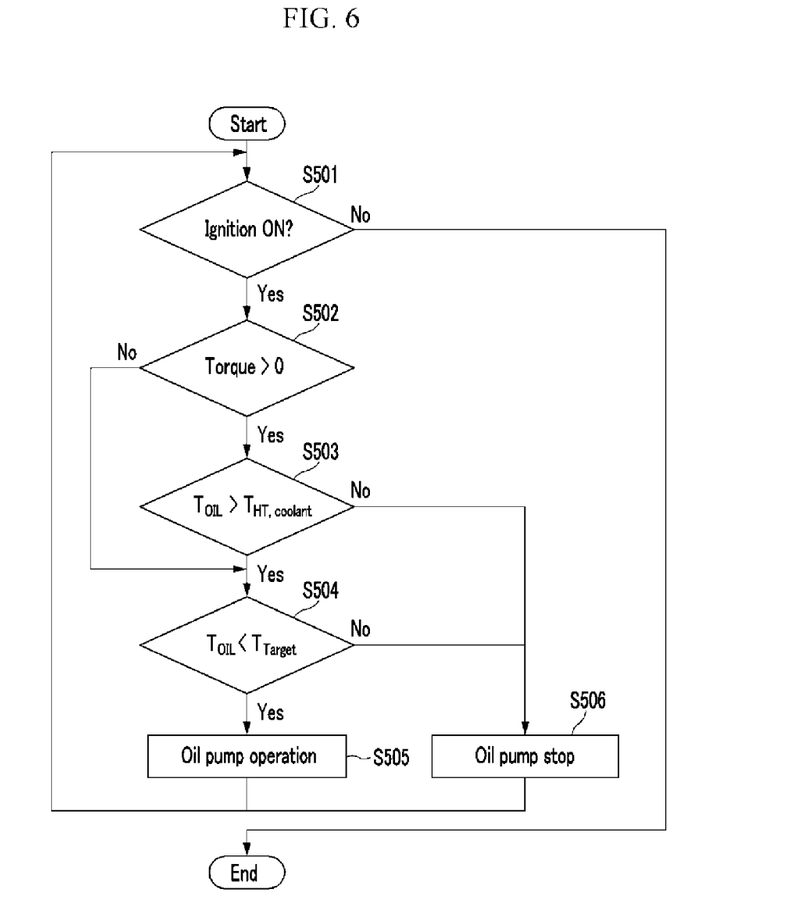
FIG. 6 is a flow chart of an exemplary gear oil warming control according to the present invention.

Referring to FIG. 6, a control is started and it is determined whether an engine is operated in a S501.

It is determined whether a torque is generated in a S502. If the torque is generated, S503 is performed, and if the torque is not generated, S504 is performed.

If the temperature of the transmission oil or the axle oil is higher than the coolant temperature in S503, S504 is performed, and If the temperature of the transmission oil or the axle oil is less than the coolant temperature, the transmission hydraulic pump or the axle hydraulic pump is operated in S506. Accordingly, the transmission oil or the axle oil is warmed up.

If temperature of the transmission oil or the axle oil is less than a target temperature in S504, the transmission hydraulic pump 64 or axle hydraulic pump 74 is operated in S505 such that the hot coolant warms up the transmission oil or the axle oil. In reverse, if the transmission oil or the axle oil is hotter than the target temperature, S506 is performed.

Figure 7:
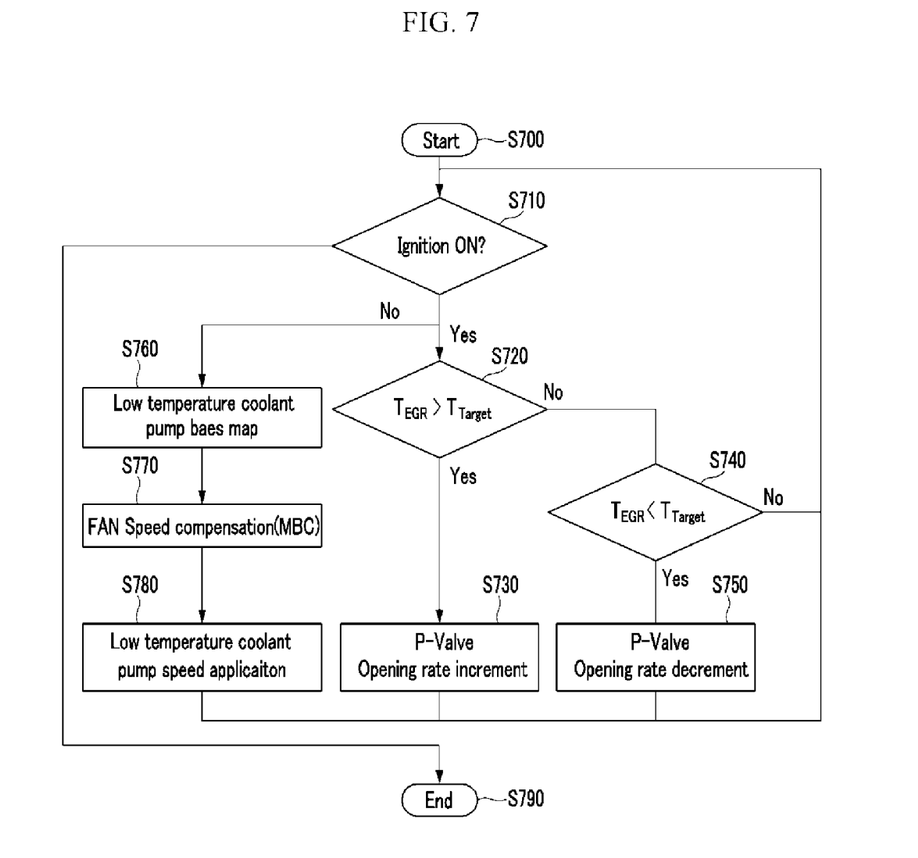
FIG. 7 is a flow chart for controlling an exemplary low temperature coolant pump according to the present invention.

Referring to FIG. 7, a control is started in S700. It is determined whether the engine is operated or not in S710. If the engine is not operated, a control is ended.

The EGR gas temperature is hotter than a target temperature in S720, an opening rate of a low temperature coolant valve 136 (i.e. P-valve) is increased in S730, and if the EGR gas temperature is less than the target temperature, S740 is performed.

If the EGR gas temperature is less than "a target temperature–d" where d is a predetermined temperature interval, for example d=2° C. in S740, an opening rate of the low temperature coolant valve 136 (i.e. P-valve) is reduced, and if the EGR gas temperature is higher than "the target temperature–d", S710 is performed.

The low temperature coolant pump 108 is operated according to a basic map in S760, the basic map of the low temperature water is compensated according to a speed of the cooling fan 30 in S770, and the low temperature coolant pump 108 is operated according to the compensated map in S780.

For convenience in explanation and accurate definition in the appended claims, the terms higher or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A cooling system of a vehicle, comprising:
    a high temperature radiator that cools a high temperature coolant circulating an engine;
    a low temperature radiator that cools a low temperature coolant passing a water cooled intercooler and a low exhaust gas recirculation cooler of a turbo charger;
    a cooling fan that blows air to the high temperature radiator and the low temperature radiator;
    a high temperature coolant pump that pumps the high temperature coolant;
    a low temperature coolant pump that pumps the low temperature coolant;
    a control portion that controls the high temperature coolant pump, the low temperature coolant pump, and the cooling fan according to driving conditions of the vehicle and environmental conditions;
    a transmission oil heat exchanger through which the high temperature coolant passes;
    a transmission pump that circulates a transmission oil through the transmission oil heat exchanger;
    an axle oil heat exchanger through which the high temperature coolant passes; and
    an axle pump that circulates an axle oil through the axle oil heat exchanger.

2. The cooling system of claim 1, wherein the control portion operates the transmission pump to warm up the transmission oil if it is determined that a temperature of the transmission oil is low, and/or operates the axle pump to warm up the axle oil if it is determined that a temperature of the axle oil is low.

3. The cooling system of claim 1, wherein the transmission pump and the axle pump are hydraulic pumps.

4. A controlling method using the cooling system of claim 1, comprising:
    detecting driving conditions of the vehicle and environmental conditions;
    setting an operating target for the cooling system and/or a lubrication system based on the driving conditions and the environmental conditions; and determining operating conditions for the cooling system and/or the lubrication system.

5. The controlling method of claim 4, wherein the driving conditions being detected include a low coolant temperature, a high coolant temperature, an engine oil temperature, a transmission oil temperature, an engine speed, an accelerator pedal position, and/or a vehicle speed.

6. The controlling method of claim 4, wherein the environmental conditions being detected include an intake air temperature, an outside temperature, and/or weather conditions.

7. The controlling method of claim 4, wherein the operating conditions being determined include a cooling fan speed, opening/closing of an electric thermostat, controls of the pumps, and/or coolant flow rates.

8. A cooling system of a vehicle, comprising:
   a high temperature radiator that cools a high temperature coolant circulating an engine;
   a low temperature radiator that cools a low temperature coolant passing a water cooled intercooler and a low exhaust gas recirculation cooler of a turbo charger;
   a cooling fan that blows air to the high temperature radiator and the low temperature radiator;
   a high temperature coolant pump that pumps the high temperature coolant;
   a low temperature coolant pump that pumps the low temperature coolant; and
   a control portion that controls the high temperature coolant pump, the low temperature coolant pump, and the cooling fan according to driving conditions of the vehicle and environmental conditions;
   wherein the control portion increases a flow rate of the low temperature coolant if a temperature of the low temperature coolant is equal to or higher than a first predetermined value, opens an electric thermostat when a temperature of the high temperature coolant is equal to or higher than a predetermined thermostat opening temperature, and closes the electric thermostat when the temperature of the high temperature coolant is less than a predetermined thermostat closing temperature.

9. A cooling system of a vehicle, comprising:
   a high temperature radiator that cools a high temperature coolant circulating an engine;
   a low temperature radiator that cools a low temperature coolant passing a water cooled intercooler and a low exhaust gas recirculation cooler of a turbo charger;
   a cooling fan that blows air to the high temperature radiator and the low temperature radiator;
   a high temperature coolant pump that pumps the high temperature coolant;
   a low temperature coolant pump that pumps the low temperature coolant; and
   a control portion that controls the high temperature coolant pump, the low temperature coolant pump, and the cooling fan according to driving conditions of the vehicle and environmental conditions;
   wherein the control portion detects a temperature of an engine oil, makes the engine oil pass an oil cooler when the engine oil temperature is equal to or higher than a second predetermined value, and makes the engine oil bypass the oil cooler when the engine oil temperature is less than the second predetermined value.

10. The cooling system of claim 9, wherein the thermostat closing temperature is a few degrees lower than the thermostat opening temperature.

11. A cooling system of a vehicle, comprising:
    a high temperature radiator that cools a high temperature coolant circulating an engine;
    a low temperature radiator that cools a low temperature coolant passing a water cooled intercooler and a low exhaust gas recirculation cooler of a turbo charger;
    a cooling fan that blows air to the high temperature radiator and the low temperature radiator;
    a high temperature coolant pump that pumps the high temperature coolant;
    a low temperature coolant pump that pumps the low temperature coolant; and
    a control portion that controls the high temperature coolant pump, the low temperature coolant pump, and the cooling fan according to driving conditions of the vehicle and environmental conditions;
    wherein the control portion operates the cooling fan at a first speed if a temperature of the high temperature coolant is equal to or higher than a third predetermined value, and operates the cooling fan at a second speed faster than the first speed if the high temperature coolant is not cooled by the first speed.

12. The cooling system of claim 11, wherein the control portion operates the low temperature coolant pump based on a base map of the low temperature coolant pump and compensates the base map of the low temperature coolant pump according to the speed of the cooling fan to control the low temperature coolant pump.

13. The cooling system of claim 11, wherein the control portion operates the high temperature coolant pump based on a base map of the high temperature coolant pump, and compensates the base map of the high temperature coolant pump according to the speed of the cooling fan to control the high temperature coolant pump.

\* \* \* \* \*